Jan. 26, 1971    K. C. HUDSON    3,558,208
OPTICAL COMPENSATING FILTER WITH SELECTIVE
RADIAL ABSORPTION DISTRIBUTION
Original Filed Oct. 11, 1967    2 Sheets-Sheet 1
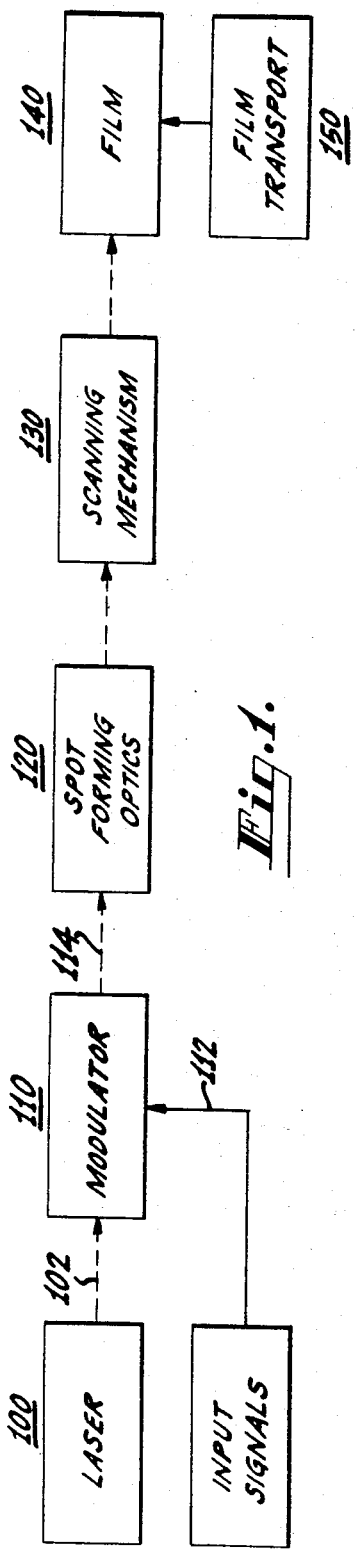
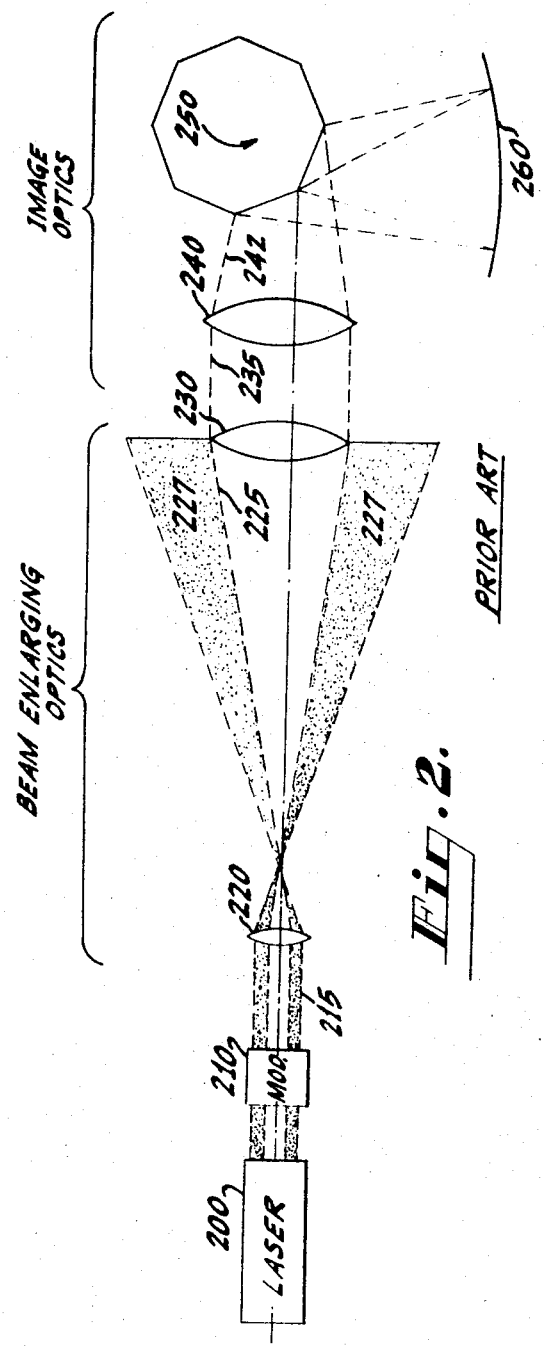
Inventor:
KENNETH C. HUDSON
By Edward J. Norton
    Attorney Jan. 26, 1971   K. C. HUDSON   3,558,208
OPTICAL COMPENSATING FILTER WITH SELECTIVE
RADIAL ABSORPTION DISTRIBUTION
Original Filed Oct. 11, 1967   2 Sheets-Sheet 2
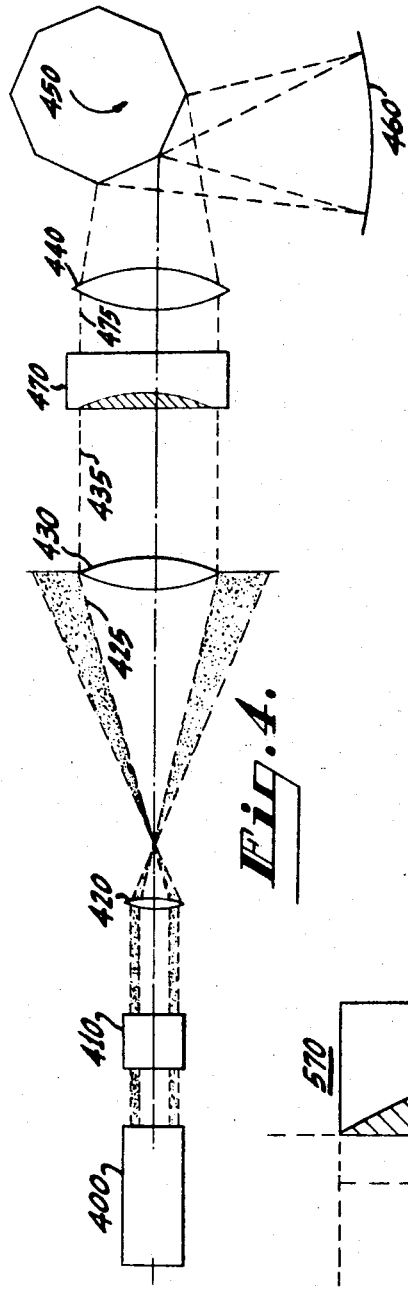
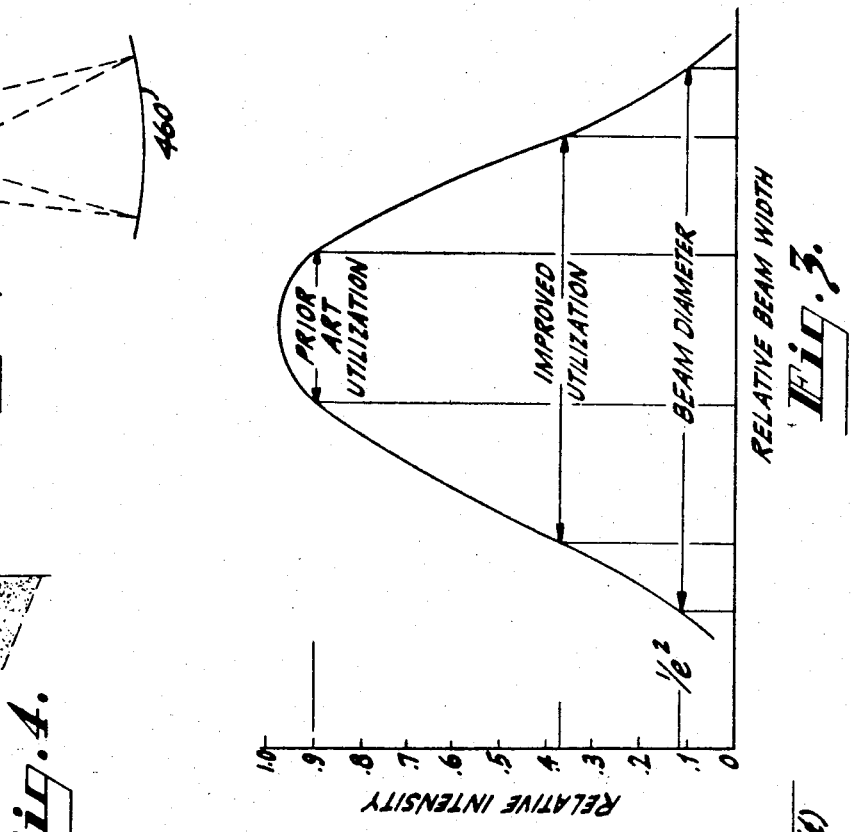
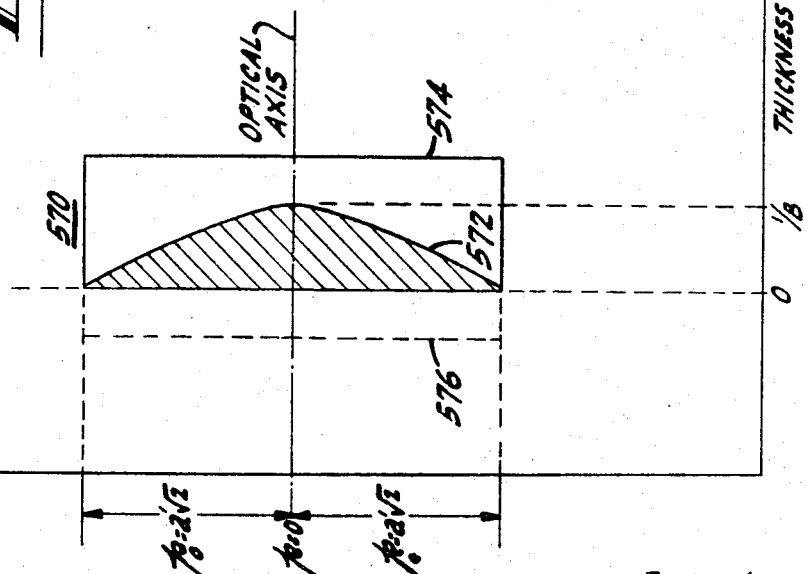
Inventor:
KENNETH C. HUDSON
By Edward J Norton
Attorney

United States Patent Office 3,558,208
Patented Jan. 26, 1971

---

3,558,208
OPTICAL COMPENSATING FILTER WITH SELECTIVE RADIAL ABSORPTION DISTRIBUTION
Kenneth C. Hudson, Philadelphia, Pa., assignor to RCA Corporation, a corporation of Delaware
Original application Oct. 11, 1967, Ser. No. 674,614, now Patent No. 3,465,347, dated Sept. 2, 1969. Divided and this application Mar. 27, 1969, Ser. No. 829,832
Int. Cl. G02b 5/22
U.S. Cl. 350—8  4 Claims

ABSTRACT OF THE DISCLOSURE

There is disclosed an optical filter, primarily for use within a laser recorder, which operates to selectively absorb portions of a light beam of nonuniform intensity passing therethrough so as to result in the emergence therefrom of a light beam of uniform intensity.

---

The invention herein described was made in the course of or under a contract or subcontract thereunder with the Department of the Air Force.

This is a division of application Ser. No. 674,614, filed Oct. 11, 1967, now U.S. Patent No. 3,465,347, September 2, 1969.

BACKGROUND OF THE INVENTION

This invention relates to flying spot recorders and, more particularly, to flying spot recorders which utilize a laser as the basic recording energy source.

To provide a maximum of recorded information per unit volume of recording media, it is necessary to use high packing density recording techniques. These techniques require a small high energy density scanning spot which is capable of being modulated by the signal to be recorded. A recording spot in the order of 5.0 microns or less in diameter can be produced by a coherent radiation source and a diffraction limited optical system. With the advent of the laser, it has become possible to produce a coherent beam of high intensity light which is capable of being modulated and focused upon a photo-sensitive film emulsion to produce a permanent record of processed signals. The optical system used for focusing the recording spot must perform the following functions:

(1) Collect and focus sufficient radiation from the modulated radiation source to expose the recording medium during the exposure time available for each recording bit;

(2) Produce an image on the recording medium that will have a spot diameter in the order of 5 microns or smaller;

(3) Provide sufficient working distance and clearance for the operation of the scanning mirror; and (4) Provide uniform energy density in the spot as it scans the recording medium.

SUMMARY OF THE INVENTION

This invention relates to a novel optical system which solves the problems inherent in focusing a modulated energy source into a high energy density recording spot and deflecting the spot across a photosensitive film in a manner to permit the energy density to remain constant as the spot traverses the film.

The utilization of a recording spot of both high intensity and small diameter is particularly desirable because it permits the achievement of a high storage density of recorded signals at an increased recording speed. It will be shown that to produce a recording spot of both high intensity and small diameter, utilizing prior art techniques, resulted in a large loss of laser power during transmission through the optical system, i.e., in the order of 90 percent. The present invention permits the production of the desired recording spot and uniform film exposure with a substantial increase in effciency of laser power transmission.

Accordingly it is an object of the present invention to provide an optical system, primarily for use within a flying spot laser recorder, which provides a high energy density recording spot.

An additional object is to provide such an optical system wherein the uniformity of energy density of the recording spot is maintained as the spot traverses the recording medium.

Another object of the present invention is to provide an optical filter system for use within a laser recorder wherein a considerably smaller enlargement of the modulated laser signal beam is required.

A further object is to provide a method of recording information utilizing a laser as the basic energy source, which results in greater efficiency of laser power utilization.

DESCRIPTION OF THE FIGURES AND PREFERRED EMBODIMENT

The present invention will be more fully understood when the following description is read in conjunction with the accompanying drawing wherein:

FIG. 1 is a block diagram of the basic components of a laser recorder;

FIG. 2 is a schematic diagram of a laser recorder as known in the prior art;

FIG. 3 is a generalized profile of a Gaussian distribution representing the beam intensity across the output beam of a laser source;

FIG. 4 is a schematic diagram of a laser recorder in accordance with the present invention; and FIG. 5 is a cross sectional view of the filter shown in FIG. 4, superimposed on a set of grid coordinates.

In the recording mode of operation of a flying spot recorder, the major functions which must be implemented are:

(a) the establishment of a basic recording energy source;

(b) modulation of this energy source by the signals to be recorded;

(c) focusing of the modulated energy source into a high energy density recording spot; and (d) scanning of a recording medium by this recording spot.

The laser has proven effective as the basic recording energy source since it is an extremely bright source consistent with wideband intensity modulation techniques. Its energy is capable of being collected and formed into a recording spot approaching diffraction limited performance at high efficiency. The intensity modulation of the laser is accomplished through the application of electro-optic techniques. Wideband modulation techniques which make use of electro-optic crystals provide intensity modulation of the external laser source by application of a signal voltage. The recording spot is formed optically. In the general case, the intensity modulated laser beam is enlarged to fill the aperture of an imaging lens. Laser beam enlargement is necessary since the aperture of the imaging lens is much larger than the laser beam diameter and, as is well known in the art, a small recording spot results when a large aperture imaging lens is complemented with a deflecting mirror of large effective aperture. Scanning of the recording film is accomplished both through movement of the recording spot across the film (scanning) and film transport past the scanning station. In a wideband laser beam recorder a rotating mirror assembly is generally used to effect scanning of the recording medium.

To reproduce the recorded signals, the developed film is transported past an unmodulated scanning spot of coherent light. The readout spot energy is modulated by being passed through the film. When collected and detected by a photosensitive device, the energy is converted into an electrical signal which corresponds with the recorded signal.

Turning now to a brief description of the recorder depicted by FIG. 1, the laser 100 provides a coherent light beam 102 of high intensity which is directed into an intensity modulator 110. The modulator 110 is simultaneously provided with input signals 112 to be recorded. The input signals 112 cause the modulator 110 to intensely modulate the laser light 102 in relation to the characteristics of the input signals 112. The modulated light 114 is focused into a high energy density recording spot by the spot forming optics 120. The recording spot is then reflected by an appropriately disposed scanning mechanism 130 onto the recording film 140 which is advanced by the film transport 150; the scanning mechanism 130 normally taking the form of a rotating polygonal mirror.

FIG. 2 shows an optical system for use in a laser recorder, in accordance with the prior art. As shown therein, the optical system of a laser recorder may be described in terms of two component sub-systems referred to as the imaging optics and the beam-enlarging optics.

The imaging optics system is represented in FIG. 2 by the imaging lens 240 and the polygonal scanning mirror 250. The modulated radiation 242 emerging from the imaging lens 240 is focused thereby onto a recording medium represented in FIG. 2 by the focal surface 260. A mechanical polygonal scanning mirror 250 is interposed between the imaging lens 240 and the recording medium 260 and, where desirable, a plane mirror (not shown) may be positioned between the imaging lens 240 and the scanning mirror 260 to deflect the image thereby permitting the scanning mirror 250 and recording medium 260 to be favorably disposed.

The beam-enlarging optical system is represented in FIG. 2 by a first lens 220 which enlarges the diameter of the modulated laser beam 215 passing therethrough and a collimating lens 230 which receives the enlarged beam 225 and collimates it for transmission to the imaging lens 240.

A laser beam emerging from a gas laser 200 generally has a diameter in the order of .025 to .250 inch, depending on the particular laser used. The distribution of the beam intensity across the laser aperture is generally Gaussian, as shown in FIG. 3, with the beam diameter defined where the intensity has decreased to $1/e^2$ of its peak value.

In order for the imaging lens 240 to form an Airy disc, thereby resulting in a high energy density scanning spot, the entrance pupil of the lens must be uniformly filled with monochromatic radiation. If the enlargement of the beam 215 by the beam-enlarging optics 220, 230 results in a collimated beam 235 of diameter less than the entrance aperture of the imaging lens 240, the distribution in the image will remain Gaussian rather than an Airy disc.

In the prior art system, as shown in FIG. 2, the irradiation across the aperture of the imaging lens 240 by an expanded laser beam 235 may be represented by:

(1) $\qquad I(p) = I_0 e^{-p^2/2a'^2}$ (Gaussian)

where $I_0$ = irradiation at center of beam
$p$ = radial distance from beam center
$a'$ = standard deviation of the expanded laser beam One method of obtaining relatively uniform irradiation is accomplished if $a'$ is made sufficiently large by the beam enlarger. For example, it may be shown (see FIG. 3) that if $a'$ is made to equal $p_0\sqrt{5}$, where $p_0$ is the maximum radial distance of the lens, then $I(p)$ decreases by only 10 percent at the edge of the lens as compared with $I_0$.

It can be shown that the laser power through the lens is represented by:

(2) $\qquad \text{Power} = P_t(1 - e^{-p^2/2a'^2})$ where $P_t$ equals the total laser power output. It may similarly be shown that setting $a'$ equal to $p_0\sqrt{5}$ results in a 90 percent diminution of the laser power transmitted through the lens.

The foregoing indicates that achieving a relatively uniform irradiation, utilizing prior art techniques, whereby the irradiation at the edge of the lens decreases by only 10 percent as compared with the irradiation at the center of the lens, results in a 90 percent loss in laser power transmitted through the lens as represented by the unused portions 227 of the enlarged beam shown in FIG. 2. Furthermore, to accomplish this result, it is readily evident that a beam enlarger of relatively large size is required to provide the necessary $a'$.

FIG. 4 shows an optical system for use in a laser recorder in accordance with the present invention. It may be readily seen that the system of FIG. 4 differs from the system of FIG. 2 essentially as a result of the inclusion of a filter 470 between the collimating lens 430 and the imaging lens 440. Furthermore, as will be shown, the characteristics of the beam-enlarging optics subsystem are substantially different from those of the subsystem of FIG. 2.

In the beam-enlarging optics subsystem shown in FIG. 4, the lens characteristics are chosen so that a substantially greater fraction of the total laser radiation 425 is collimated by lens 430 and transmitted therethrough. This results in a highly nonuniform irradiation across the exit pupil of the collimating lens 430, which is graphically represented in FIG. 3. The collimated beam 435 of nonuniform irradiation is then transmitted through the filter 470 which operates to selectively absorb portions of the beam such that upon emergence therefrom the imaging lens 440 is uniformly irradiated and therefore capable of transforming the distribution of the beam 475 passing therethrough into an Airy disc.

It has been found that a filter designed in accordance with the following teachings will accomplish the desired result, i.e., the emergence therefrom of a beam of uniform irradiation coupled with a more efficient utilization of laser power, and permits the formation of a recording spot exhibiting uniform energy density as it scans the recording medium. Furthermore, the optical magnification required is significantly decreased, thereby simplifying the design of the beam-enlarging optical system.

If, as shown in FIG. 4, a filter 470 is placed between the collimating lens 430 and the imaging lens 440, the irradiation $I_L$ of the imaging lens 400 is represented by:

(3) $\qquad I_L = I(p) T(p)$ where $T(p)$ = transmission characteristic of the filter as a function of $p$.

By designing the filter 470 such that (4) $\qquad T(p) = e^{(p^2 - p_0^2)/2a'^2}$ it follows that (5) $\qquad I_L = I_0 e^{-p_0/2a'^2}$ which is a constant value at every point along the surface of the imaging lens 440; the value of $p_0$ being a physical dimension fixed by the lens aperture and $a'$ depending on the beam magnification.

The optimum value for $a'$, which may be solved for by maximizing the power to the aperture of the image lens 400 equals $p_0/\sqrt{2}$. This results in a transmission of approximately 3.7 times the laser power through the lens when compared with the prior art as represented by FIG. 2.

For an optical absorbing medium of the type described, the transmission is given by Beer's Law:

(6) $$T=e^{-Bt}$$

where

B = attenuation constant
t = thickness.

As shown in FIG. 5, which represents a preferred embodiment of the present invention, the thickness ($t$) of the filter 570 will vary as a function of the radial distance ($p$) measured from the optical axis of the filter. Utilizing the foregoing relationships and solving for $t$ reveals:

$$t=\frac{1}{B}-\frac{p^2}{2a'^2 B}$$

(7)

Equation 7 is the equation of a parabola. The grid coordinates in FIG. 5 have superimposed thereon a representation of this parabola with the thickness ($t$) plotted as a function of radial distance ($p$) measured from the optical axis.

It may be seen that when $p$ is equal to zero, $t$ equals $1/B$; and when $p$ is equal to $p_0$ (which equals $a'\sqrt{2}$ as an optimum condition, $t$ equals zero.

To meet the design requirements previously set forth, the transmission at the center of the filter (i.e., $p=0$) should be approximately 37 percent of the transmission at the edge of the filter (i.e., $p=p_0=a'\sqrt{2}$), where the transmission is theoretically 100 percent. As a practical matter 100 percent transmission is never attained due to reflections. These reflections can however, be minimized through the use of anti-reflective coatings.

The absorbing material 572 and/or the index matching material 574 may be a liquid or a solid. Choosing an absorbing material 572 with a relatively high attenuation coefficient (B) has two advantages; the absorption of the index matching material 520 which varies with thickness can be neglected; and a spherical approximation can be made for the parabola since the center thickness of the absorbing material 572 becomes much smaller than the maximum radius ($p_0$). A spherical surface is significantly easier to achieve in practice than a paraboloid. If a cover material 576 is required for containing the absorbing material 572, its refractive index may be of any value since it will generally take the shape of a plane parallel disc. In practice it will usually be expedient to make the cover 576 of the same optical material as the index matching material 574.

A representative list of absorbing materials, and their characteristics, is presented below:

| Material | B (mm.⁻¹) | t (mm.) |
|---|---|---|
| Barium titanate (single crystal) | 2.8 | 0.30 |
| Glass (Corning) | 1.0 | 1.0 |
| Neutral gray glass (Schott NG-11) | 0.313 | 3.2 |

While there has been shown and described herein a preferred embodiment of the invention, many changes will be readily apparent to those skilled in the art. For example, a filter of uniform thickness wherein the attenuation constant of the absorbing material is varied as a function of $p$ may be used; or any of a number of combinations of filter thicknesses and attenuation constants may be designed. Such changes are to be considered as being within the scope of the invention, and it is intended to limit same only as defined in the claims which follow.

What is claimed is:

1. An optical filter capable of transforming a certain input light beam impinging thereon, said certain input beam having an intensity which varies from point to point over its cross sectional area in accordance with a predetermined Gaussian function, to an output light beam emerging therefrom, said output beam having an intensity which is uniform from point to point over its cross sectional area, said filter having a transmission characteristic T which varies from point to point over its cross sectional area as a function of the radial distance $p$ measured from its optical axis, in accordance with the relationship:

$$T=e^{p^2-p_0^2/2a'^2}$$

where $e$ is the base of the natural logarithm system;
$p_0$ is the maximum radial distance of said filter; and
$a'$ is the standard deviation of said predetermined Gaussian function of said certain input beam.

2. An optical filter as defined in claim 1, said filter comprising a homogeneous medium having a fixed attenuation coefficient B, the dimensional thickness $t$ of said medium varying in a direction parallel to the light beam passing therethrough as a function of the radial distance $p$, measured from the optical axis of said filter, substantially in accordance with the relationship:

$$t=\frac{1}{B}-\frac{p^2}{2a'^2 B}$$

3. An optical system for transforming a modulated energy source supplied thereto into a high energy density spot capable of being deflected across a focal surface wherein the energy density of the spot remains substantially constant as it traverses the focal surface, said modulated energy source characterized by a beam of light having an intensity which varies from point to point over its cross sectional area in accordance with a predetermined Gaussian function, comprising:

(a) means for enlarging the cross sectional area of said modulated energy source;
(b) means for collimating a selected portion of said enlarged modulated energy source;
(c) an optical filter disposed to receive said selected portion of said enlarged beam, said filter having a transmission characteristic which varies from point to point over its cross sectional area as a function of the radial distance measured from its optical axis, said filter selectively absorbing portions of said enlarged modulated energy source to cause said enlarged modulated energy source to emerge from said filter with an intensity which is uniform from point to point over its cross sectional area; and
(d) imaging means disposed to receive said uniform intensity energy source and focus same into a high energy density spot.

4. An optical system as defined in claim 3 wherein the transmission characteristic of said optical filter varies in accordance with the relationship $$T=e^{p^2-p_0^2/2a'^2}$$

where $e$ is the base of the natural logarithm system;
$p$ is the radial distance of said filter measured from its optical axis;
$p_0$ is the maximum radial distance of said filter; and
$a'$ is the standard deviation of the Gaussian function of said enlarged beam as it enters said optical filter.

References Cited

UNITED STATES PATENTS 3,362,285  1/1968  Hora _____ 331—94.5X

DAVID SCHONBERG, Primary Examiner

T. H. KUSMER, Assistant Examiner

U.S. Cl. X.R.

331—94.5; 346—100; 350—314